US009233660B1

United States Patent
Farooq et al.

(10) Patent No.: US 9,233,660 B1
(45) Date of Patent: Jan. 12, 2016

(54) ARMREST ASSEMBLY INCLUDING MOVABLE CORE

(71) Applicant: Ford Global Technologies, LLC, Dearborn, MI (US)

(72) Inventors: Iskander Farooq, Novi, MI (US); Mohammed Omar Faruque, Ann Arbor, MI (US); Dean M. Jaradi, Macomb, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 14/495,102

(22) Filed: Sep. 24, 2014

(51) Int. Cl.
*B60R 21/04* (2006.01)
*B60N 2/46* (2006.01)
*B60R 13/02* (2006.01)
*B60R 21/00* (2006.01)

(52) U.S. Cl.
CPC ............ *B60R 21/0428* (2013.01); *B60N 2/466* (2013.01); *B60R 13/0243* (2013.01); *B60R 2013/0287* (2013.01); *B60R 2021/0006* (2013.01)

(58) Field of Classification Search
CPC ............ B60R 21/0428; B60R 13/0243; B60R 2021/0006; B60N 2/4606; B60N 2/46
USPC ........................ 296/1.09, 187.05, 187.12, 153
See application file for complete search history.

(56) References Cited

U.S. PATENT DOCUMENTS

| 6,145,919 | A | * | 11/2000 | Mysliwiec et al. ........... | 296/153 |
| 6,568,743 | B1 | | 5/2003 | Jayasuriya et al. | |
| 7,556,301 | B2 | | 7/2009 | Govind et al. | |
| 7,654,597 | B1 | * | 2/2010 | Farooq ......................... | 296/1.09 |
| 7,794,008 | B2 | | 9/2010 | Hall et al. | |
| 7,934,771 | B2 | | 5/2011 | Tamakoshi et al. | |
| 2010/0201112 | A1 | * | 8/2010 | Subbian et al. ............... | 280/784 |

FOREIGN PATENT DOCUMENTS

| JP | 2007-253674 | A | * | 10/2007 |
| WO | WO-2009040053 | A1 | * | 4/2009 |
| WO | WO 2013156098 | A1 | | 10/2013 |

OTHER PUBLICATIONS

Machine Translation of JP2007253674A printed from the JPO website, Aug. 10, 2015.*
Machine Translation of WO2009040053A1 printed from the EPO website, Aug. 10, 2015.*

* cited by examiner

*Primary Examiner* — Jason S Morrow
(74) *Attorney, Agent, or Firm* — Frank A. MacKenzie; Bejin Bieneman PLC

(57) ABSTRACT

A side impact system for a vehicle includes a trim panel and an armrest core supported by the trim panel. The armrest core is moveable translationally relative to the trim panel from a supporting position to a deployed position below the supporting position. An actuator is connected to the armrest core for moving the armrest core from the supporting position to the deployed position. In the supporting position, the armrest core may be adjacent a ribs of an occupant and, in the deployed position, the armrest core may be adjacent the hips of the occupant. The actuator may move the armrest core to the deployed position during a side impact of the vehicle to reduce the likelihood that the armrest core is pushed into the ribs of the occupant.

21 Claims, 8 Drawing Sheets

ARMREST ASSEMBLY INCLUDING MOVABLE CORE

BACKGROUND

A vehicle, such as an automobile, includes two or four doors allowing for ingress and egress. Each door includes a door panel facing externally and a trim panel connected to the door panel and facing inwardly toward a passenger compartment of the vehicle. The door panel is typically formed of metal and the trim panel is typically formed of polymer such as, plastic, vinyl, etc.

The trim panel provides an aesthetic appearance in the passenger compartment of the vehicle. The trim panel may include a shell and a console supported on the shell. The console may support several features such as a finger well for opening and closing a door, switches for automatic windows and door locks, etc.

An armrest is mounted to trim panel and/or the console for supporting the arm of an occupant of the vehicle while the occupant rides in the vehicle and for supporting the occupant during ingress and egress. The armrest and the console are subject to durability requirements. Specifically, the console, along with the connection between the console and the shell, is designed to withstand repeated pushing and pulling associated with opening and closing the door. The armrest, along with the connection between the armrest and the shell, is designed to withstand forces exerted on the armrest by the occupant during ingress and egress, and to withstand forces exerted on the armrest by the occupant while travelling in the vehicle. Accordingly, the console and the armrest are formed to be rigid and the shell, console, and armrest are designed to be rigidly connected to each other.

During side impact of the vehicle, the door panel may bow inwardly, forcing the trim panel inwardly toward the occupant. The door is typically designed such that the armrest is aligned laterally with the ribs of the occupant. As such, as the door panel bows inwardly during a side impact, the door panel may force the armrest into the ribs of the occupant.

Competing design factors exist due to the desire to design the armrest to be rigid to support the occupant, e.g., during ingress and egress and during travel, versus the desire to avoid injury to the ribs of the occupant during a side impact. There remains an opportunity to design an armrest assembly that avoids these competing design factors.

DETAILED DESCRIPTION

Figure 1:
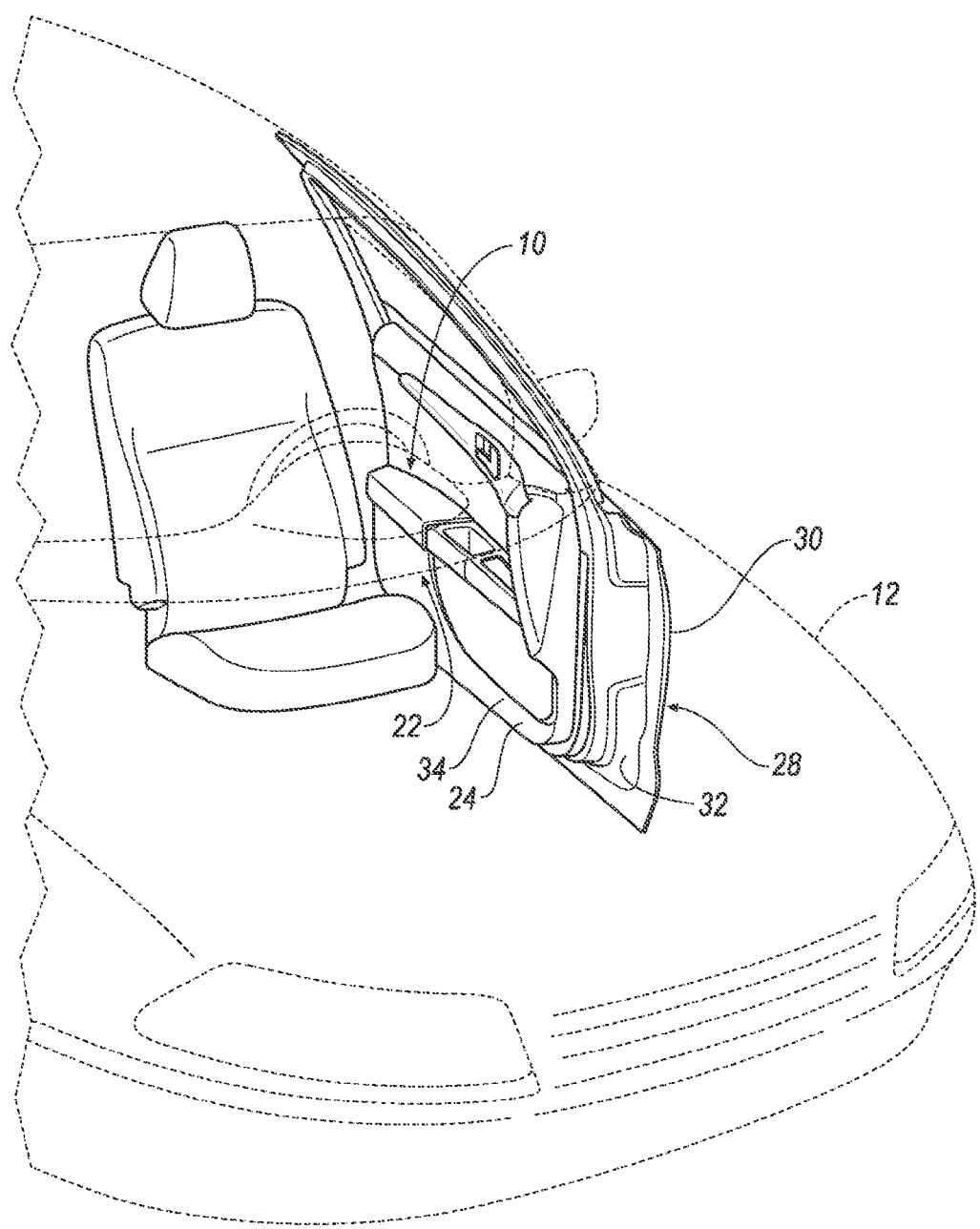
FIG. 1 is a perspective view of a vehicle shown in broken lines including a door and a seat adjacent the door.

With reference to the Figures, wherein like numerals indicate like parts throughout the several views, an armrest assembly 10 for a door 28 of a vehicle 12 includes an armrest core 14. As shown in FIG. 4, the armrest core 14 includes a top surface 16 and a side 18 extending transverse to the top surface 16. As shown in FIGS. 2-3 and 4-7, an actuator 20 is spaced from the armrest core 14. A cable 52 extends from the actuator 20 to the armrest core 14.

Figure 5:
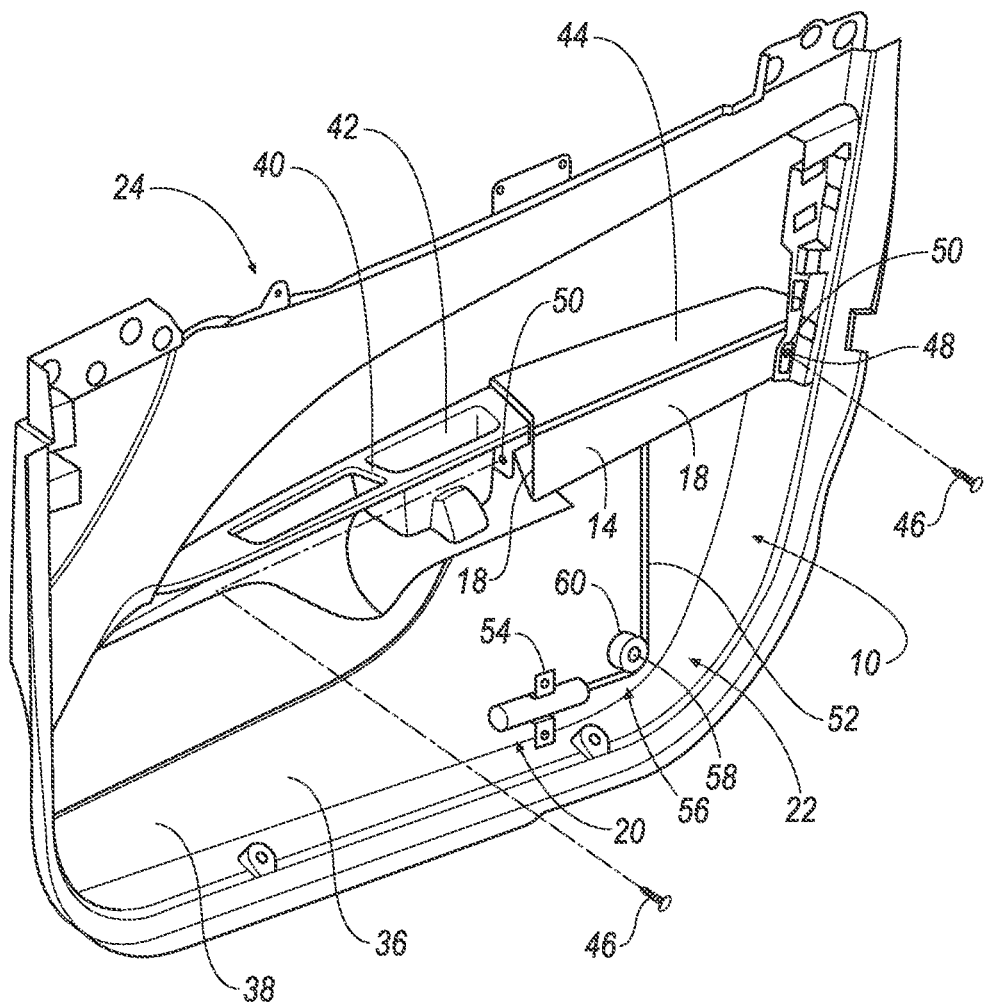
FIG. 5 is a perspective view of a rear side of the trim panel and the armrest core connected to the trim panel in a supporting position for supporting an arm of an occupant of the vehicle.
Figure 6:
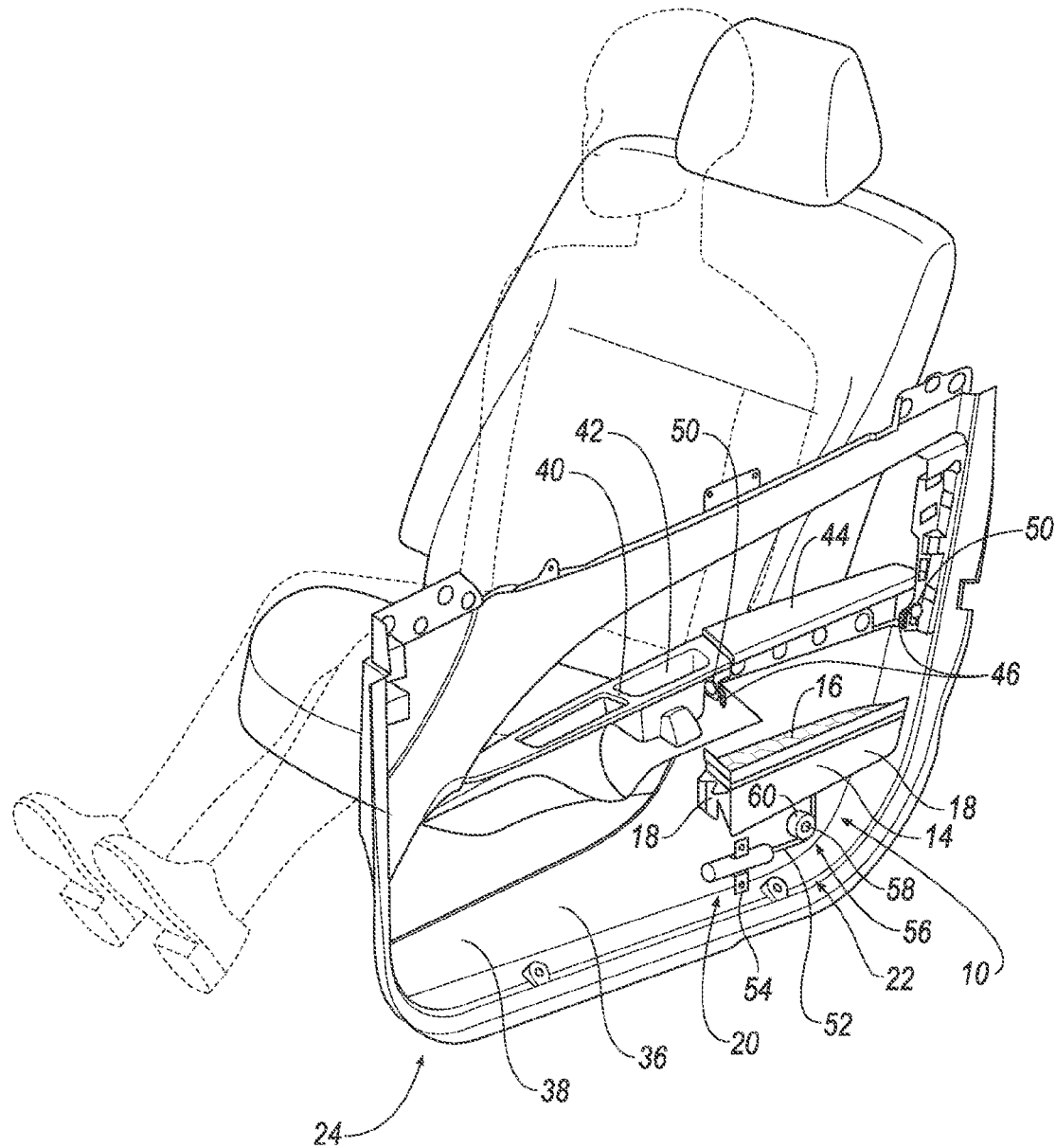
FIG. 6 is perspective view of the seat supporting the occupant, and the rear side of the trim panel with the armrest core in a deployed position.
Figure 7:
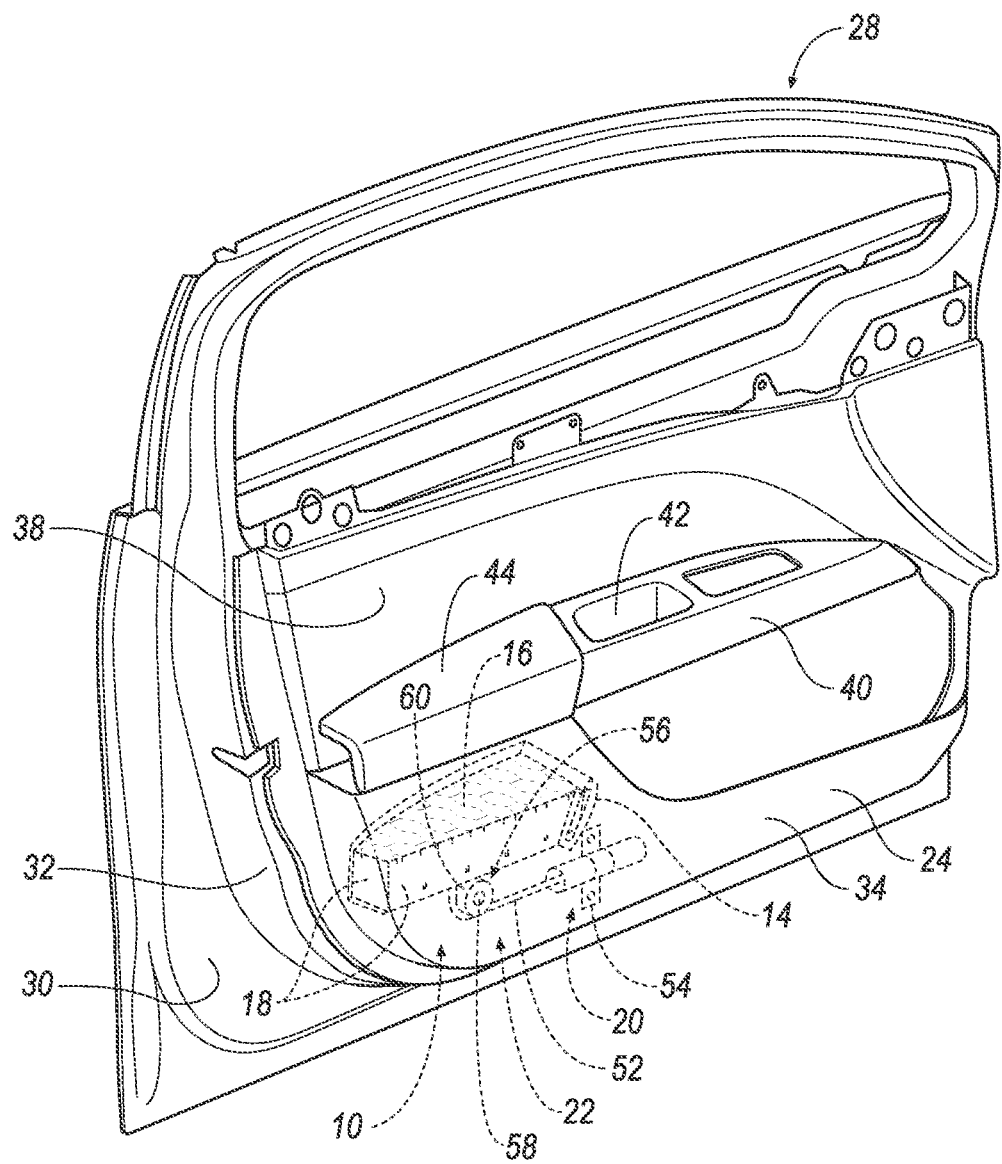
FIG. 7 is a perspective view of the door including a front side of the trim panel with the armrest core shown in hidden lines in the deployed position.

With reference to FIG. 1, a side impact system for the vehicle 12 may include the armrest assembly 10. For example, the side impact system 22 includes a trim panel 24, and the armrest core 14 is supported by the trim panel 24. The armrest core 14 is moveable translationally relative to the trim panel 24 from a supporting position, as shown in FIG. 5, to a deployed position below the supporting position, as shown in FIGS. 6 and 7. The actuator 20 is connected to the armrest core 14 for moving the armrest core 14 from the supporting position to the deployed position.

Figure 2:
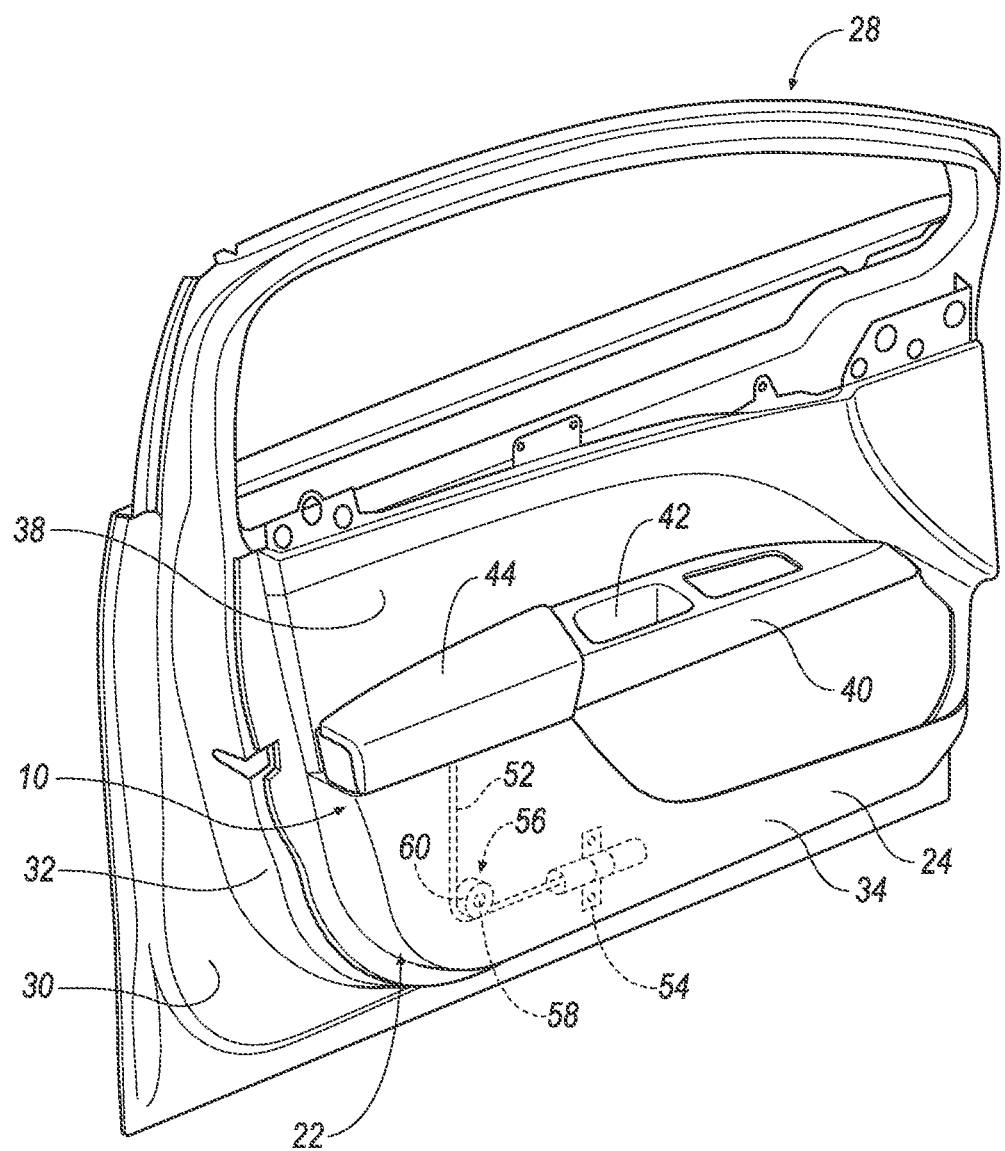
FIG. 2 is a perspective view of the door including a door panel, a trim panel, and an armrest assembly connected to the trim panel.

With reference to FIGS. 1-2 and 6, when in the supporting position, the armrest core 14 is positioned to support an arm of an occupant (shown in FIG. 6) when the occupant is seated in the vehicle 12. The armrest core 14 is also positioned to support an occupant during ingress and egress, e.g., to support the weight of the occupant when the occupant leans on the armrest assembly 10.

With reference to FIGS. 1-2 and 5-6, the armrest core 14 may be aligned with ribs of the occupant when the armrest core 14 is in the supporting position. During a side impact, e.g., a vehicle-to-vehicle collision, the armrest core 14 may be pushed inwardly toward the occupant. The actuator 20 moves the armrest core 14 from the supporting position to the deployed position to reduce the possibility that the armrest core 14 is forced against the ribs of the occupant. In the deployed position, for example, the armrest core 14 may be aligned with the hips of the occupant. In such a configuration, the armrest core 14 acts as a pelvis pusher that advantageously pushes the occupant toward a center of the vehicle 12, and may eliminate the need for a separate pelvis pusher. As set forth below, the actuator 20 may be activated by an impact sensing system 26.

The door 28 may include a hinge (not shown) pivotally mounted to a body of the vehicle 12. Although the door 28 is shown as a driver side front door in the Figures, the door 28 may be any door of the vehicle 12.

Figure 3:
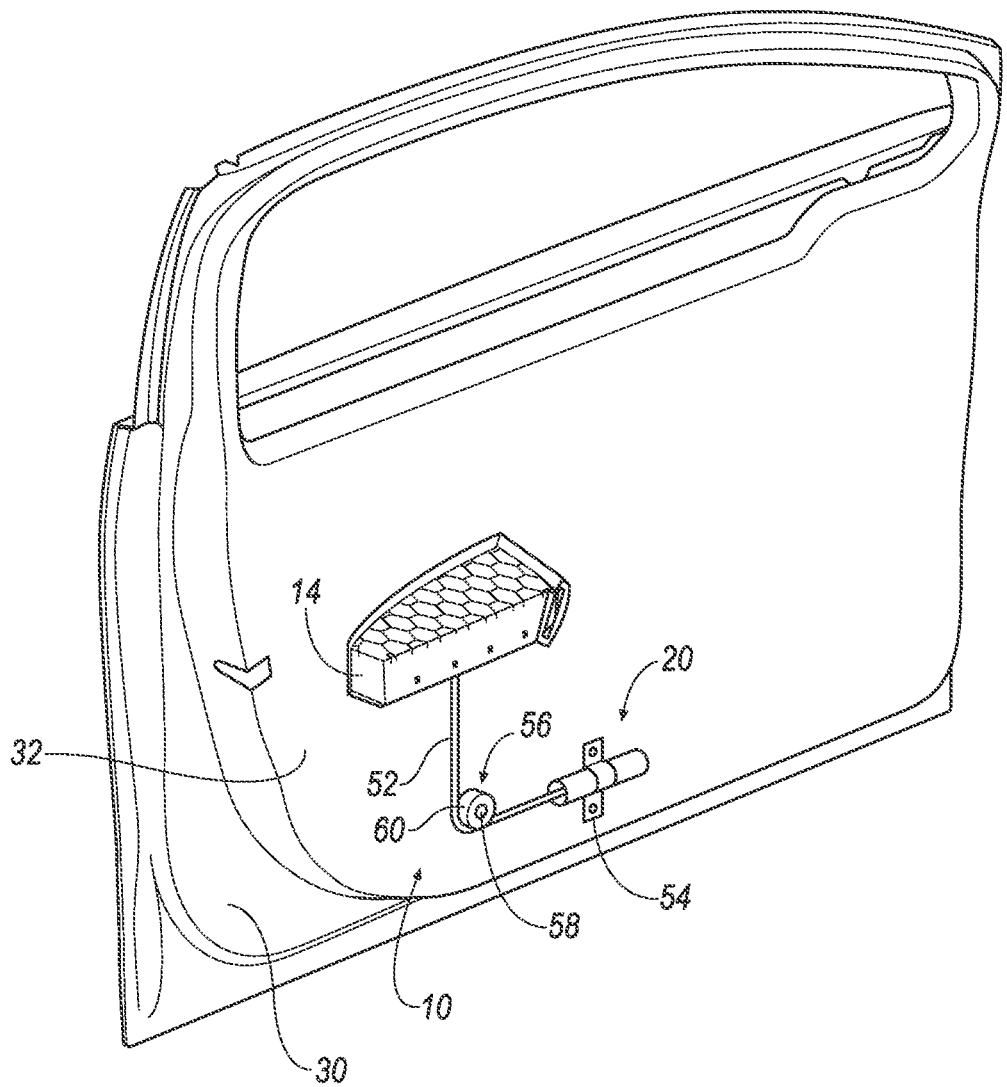
FIG. 3 is a perspective view of the door panel, an actuator and a pulley mounted to the door panel, and armrest core and cover spaced from the door panel and connected to the actuator and the armrest core with a cable.
Figure 4:
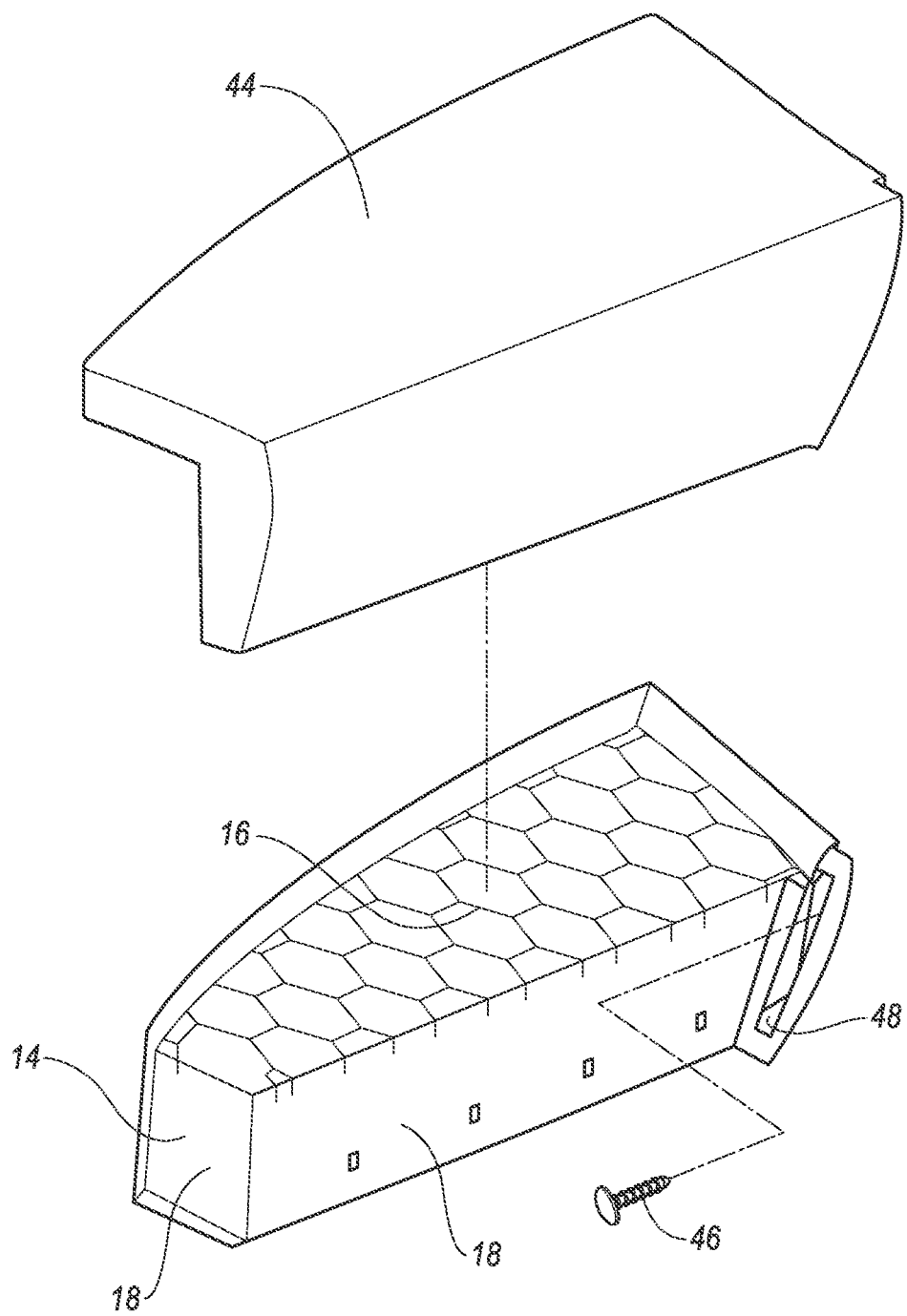
FIG. 4 is an exploded view of an outer layer and an armrest core of the armrest assembly.

With reference to FIG. 3, the door 28 includes a door panel 30. The door panel 30 presents an exterior surface (not shown) and an interior surface 32. The door panel 30 may be formed of metal, such as steel, and may support hardware such as a window, exterior handles, etc.

With reference to FIGS. 2 and 5-7, the trim panel 24 includes an interior surface 34 facing the interior of the vehicle 12, i.e., facing the occupant, and an exterior surface 36 facing the door panel 30. The interior surface 34 provides an aesthetic appearance.

With reference to FIG. 2, the trim panel 24 is supported on the door panel 30. Specifically, the trim panel 24 includes a shell 38 mounted to the interior surface 32 of the door panel 30 in any suitable manner, e.g., with clips, pins, etc. The shell 38 may support features such as an interior door handle, a map holder, etc. The shell 38 may be formed of polymeric materials such as plastic and/or vinyl, etc.

With continued reference to FIG. 2, the trim panel 24 may include a console 40 supported on the shell 38. The console 40 may support a finger well 42 for opening and closing the door 28, switches for automatic windows and door locks, etc. The console 40 may be formed of polymeric materials such as plastic and/or vinyl, etc.

The console 40 may be mounted to the shell 38 in any suitable manner such as with clips, pins, adhesives, etc., and combinations thereof. The console 40 may be designed to withstand repeated pushing and pulling associated with opening and closing the door 28. The console 40 may also be designed to withstand forces exerted on the armrest assembly 10 by the occupant during ingress and egress, and to withstand forces exerted on the armrest assembly 10 by the occupant while travelling in the vehicle 12.

The armrest assembly 10 is supported on the shell 38 between the exterior surface 36 of the trim panel 24 and the interior surface 32 of the door panel 30. An armrest assembly 10 is mounted to trim panel 24 and/or the console 40 for supporting the arm of the occupant of the vehicle 12 while the occupant rides in the vehicle 12 and for supporting the occupant during ingress and egress.

With reference to FIGS. 4-6, the armrest assembly 10 includes the armrest core 14 and an outer layer 44 disposed on the armrest core 14. The armrest core 14 is rigid relative to the outer layer 44. For example the outer layer 44 may be formed of a material that is flexible and/or compressible relative to the armrest core 14. The armrest core 14 and the outer layer 44 may be formed of polymeric material. The armrest core 14, for example, may be formed of plastic. The outer layer 44, for example, may be formed of plastic and/or vinyl.

The outer layer 44 is connected to the trim panel 24. The outer layer 44 may be integrally formed with the trim panel 24, i.e., formed simultaneously as a single unit. Alternatively, the outer layer 44 may be formed separately from the trim panel 24 and subsequently fixed to the trim panel 24 by adhesive, fusing, welding, fasteners, etc. The outer layer 44 may present an aesthetic appearance, i.e., may be a class-A surface.

With reference to FIGS. 5-7, the armrest core 14 is moveable relative to the outer layer 44 from the supporting position, as shown in FIG. 5, to the deployed position, as shown in FIGS. 6-7. The outer layer 44 disposed on the armrest core 14 and is configured to be separable from the armrest core 14 as the armrest core 14 moves to the deployed position. As the armrest core 14 moves from the supporting position to the deployed position, the armrest core 14 may separate from the outer layer 44. Specifically, the outer layer 44 may remain stationary relative to the trim panel 24 while the armrest core 14 moves from the supporting position to the deployed position.

The outer layer 44 may cover the armrest core 14, e.g., to aesthetically conceal the armrest core 14 in the supporting position. The outer layer 44 may be spaced from or may abut the armrest core 14 when the armrest core 14 is in the supporting position.

With reference to FIG. 4, as set forth above, the armrest core 14 includes the top surface 16 and the side 18 extending transverse to the top surface 16. The side 18 is connected to the trim panel 24 when the armrest core 14 is in the supporting position.

As set forth above, the armrest core 14 may be moveable translationally relative to the trim panel 24. In other words, the armrest core 14 may be moveable along a line. For example, the armrest core 14 may move along a line downwardly, e.g., a generally vertical line, from the outer layer 14 toward the actuator 20 when the actuator 20 is activated. The armrest core 14 may, for example, slide downwardly between the shell 38 and the door panel 30, as shown in FIG. 7. In additional to translational movement relative to trim panel 24, the armrest core 14 may rotate relative to the trim panel 24 (not shown).

A frangible connection 46 extends between the side 18 of the armrest core 14 and the trim panel 24, e.g., the shell 38 and/or the console 40, when the armrest core 14 is in the supporting position. The frangible connection 46 is designed to withstand forces exerted on the armrest assembly 10 by the occupant during ingress and egress, and to withstand forces exerted on the armrest assembly 10 by the occupant while travelling in the vehicle 12. For example, the frangible connection 46 may be designed to withstand normal operating force, e.g., up to 200-300 lbs. The frangible connection 46 is also configured to yield when the actuator 20 is activated as the armrest core 14 moves relative to the trim panel 24. In other words, the actuator 20 applies a force greater than the normal operating force to bend and/or break the frangible connection 46 and move the armrest core 14 to the deployed position.

The armrest core 14 may include at least one connection feature 48 on the side 18 of the armrest core 14 for connecting the armrest core 14 to a trim panel 24. The trim panel 24 may include at least one connection feature 50. The frangible connection 46 may engage the connection feature 48 of the armrest core 14 and the connection feature 50 of the trim panel 24. The connection features 48, 50 may be, for example, holes or slots.

For example, as shown in FIG. 5, one frangible connection 46 may connect to one connection feature 50, e.g., a hole in the console 40, and to one connection feature 48 on the side 18 of the armrest core 14, e.g., a slot as shown in FIG. 4. With continued reference to FIG. 5, another frangible connection 46 may connect to one connection feature 50, e.g., a slot in the shell 38, and to one connection feature 48 on the side 18 of the armrest core 14, e.g., a hole. Alternatively, any suitable number of frangible connections 46 may connect the armrest core 14 to the trim panel 24.

The frangible connection 46 may be a pin extending transversely to the side 18 of the armrest core 14 and the trim panel 24 when the armrest core 14 is in the supporting position. The pin may be, for example, a Christmas tree fastener, as shown in FIGS. 4-6. Alternatively, the frangible connection 46 may be any suitable fastener, pin, clip, etc.

As shown in FIG. 6, the armrest core 14 may bend the frangible connection 46, e.g., the Christmas tree fastener, as the armrest core 14 moves to the deployed position. The frangible connection 46 may, for example, remain engaged with the connection feature 50 of the trim panel 24 and break away from the connection feature 48 of the armrest core 14, as shown in FIG. 6.

A cable 52 may extend from the actuator 20 to the armrest core 14 to transmit movement from the actuator 20 to the armrest core 14. The cable 52 may be connected to the armrest core 14 and the actuator 20 in any suitable fashion. The cable 52 may be flexible to change the direction of motion transmission.

The actuator 20 may be a pyrotechnic actuator. For example, the actuator 20 may include a base (not numbered), a rod (not shown) supported by the base and connected to the cable 52, and a pyrotechnic charge (not shown) disposed between the cylinder and the rod. The pyrotechnic charge may be ignited by an electric impulse. When the pyrotechnic charge is ignited, the pyrotechnic charge combusts to move the rod relative to the cylinder pull the cable 52. For example, in FIG. 2, the actuator 20 pulls the cable 52 to the right, which pulls the armrest core 14 downwardly.

The door panel 30 may present a reaction surface (not shown) with the actuator 20 disposed between the reaction surface and the cable 52. The reaction surface is fixed relative to the actuator 20 adjacent to the actuator 20 for supporting the actuator 20 when the actuator 20 is activated.

With reference to FIG. 3, a bracket 54 may connect the actuator 20 to the door panel 30. The bracket 54 may be of any suitable size and shape to connect the actuator 20 to the door panel 30 and may engage the actuator 20 and the door panel 30 in any suitable fashion.

With continued reference to FIG. 3, a guide member 56 may be connected to the door panel 30 spaced from the actuator 20. The cable 52 may turning about the guide member 56 between the actuator 20 and the armrest core 14. In other words, the cable 52 may engage the guide member 56 and may change direction about the member between the actuator 20 and the armrest core 14.

The guide member 56 may be, for example, a pulley having a post 58 connected to the door panel 30 and a wheel 60 rotatably connected to the post 58. Alternatively, the guide member 56 may be of any suitable configuration, e.g., a stationary post.

The actuator 20 may be configured to be disposed below the armrest core 14 and to pull the armrest core 14 downwardly. The actuator 20 may be offset from the armrest core 14 with the cable 52 extending about the guide member 56. Alternatively, the actuator 20 may be disposed beneath the armrest core 14 and may directly pull the armrest core 14 downwardly, i.e., without the guide member 56.

Figure 8:
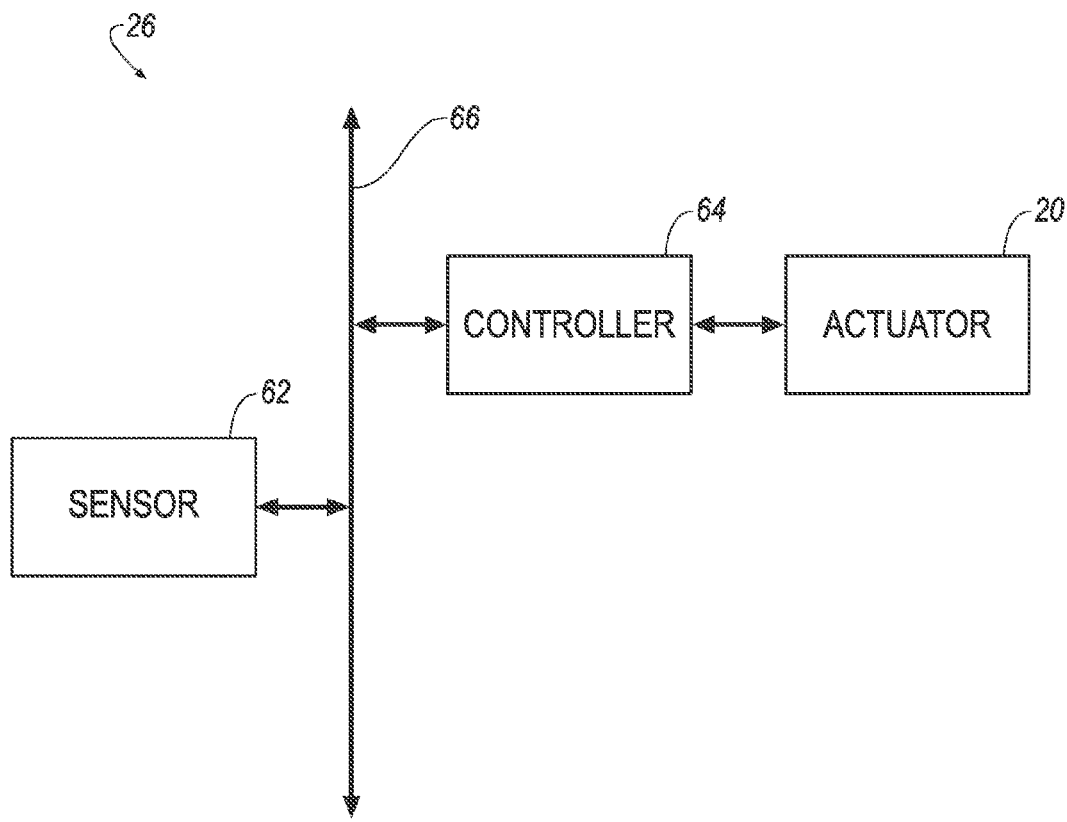
FIG. 8 is a schematic of an impact sensing system of the vehicle.

With reference to FIG. 8, the impact sensing system 26 may include at least one sensor 62 for sensing side impact of the vehicle 12, and a controller 64 in communication with the sensor 62 and the actuator 20 for activating the actuator 20, e.g., for providing an impulse to the pyrotechnic charge of the actuator 20, when the sensor 62 senses a side impact of the vehicle 12. Alternatively or additionally to sensing impact, the impact sensing system 26 may be configured to sense side 18 impact prior to impact, i.e., pre-crash sensing. The sensor 62 may be of any suitable type, e.g., using radar, lidar, and/or a vision system. The vision system may include one or more cameras, CCD image sensors 62, and/or CMOS image sensor 62, etc.

The controller 64 may be a microprocessor-based controller. The sensor 62 is in communication with the controller 64 to communicate data to the controller 64. Based on the data communicated by the sensor 62, the controller 64 instructs the actuator 20 to activate.

The controller 64 and the sensor 62 may be connected to a communication bus 66, such as a controller area network (CAN) bus, of the vehicle 12. The controller 64 may use information from the communication bus 66 to control the activation of the actuator 20. The actuator 20 may be connected to the controller 64, as shown in FIG. 8, or may be connected to the communication bus 66.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A side impact system for a vehicle, the side impact system comprising:
   a trim panel;
   an armrest core supported by the trim panel and moveable translationally relative to the trim panel from a supporting position to a deployed position below the supporting position;
   an actuator connected to the armrest core for moving the armrest core from the supporting position to the deployed position; and
   a cable extending from the actuator to the armrest core.

2. The side impact system as set forth in claim 1 further comprising an outer layer disposed on the armrest core and connected to the trim panel, the armrest core being moveable relative to the outer layer from the supporting position to the deployed position.

3. The armrest assembly as set forth in claim 2 wherein the armrest core is rigid relative to the outer layer.

4. The side impact system as set forth in claim 1 wherein the armrest core includes a top surface and a side extending transverse to the top surface, the side being connected to the trim panel when the armrest core is in the supporting position.

5. The side impact system as set forth in claim 4 further comprising a frangible connection between the side of the armrest core and the trim panel when the armrest core is in the supporting position.

6. The side impact system as set forth in claim 5 wherein the frangible connection is a pin extending transversely to the side of the armrest core and the trim panel when the armrest core is in the supporting position.

7. The side impact system as set forth in claim 1 wherein the actuator is configured to be disposed below the armrest core and to pull the armrest core downwardly.

8. The side impact system as set forth in claim 1 further comprising a guide member spaced from the actuator with the cable turning about the guide member between the actuator and the armrest core.

9. The side impact system as set forth in claim 8 wherein the guide member is a pulley.

10. The side impact system as set forth in claim 1 further comprising a side impact sensor.

11. The side impact system as set forth in claim 10 further comprising a control module in communication with the side impact sensor and the actuator.

12. The side impact system as set forth in claim 1 wherein the actuator includes a pyrotechnic charge.

13. An armrest assembly for a vehicle, the armrest assembly comprising:
    an armrest core including a top surface and a side extending transverse to the top surface;
    an actuator spaced from the armrest core and configured to move the armrest core from a supporting position to a deployed position below the supporting position;
    a cable extending from the actuator to the armrest core; and
    a connection feature on the side of the armrest core for connecting the armrest core to a trim panel; and
    a frangible connection engaging the connection feature.

14. The armrest assembly as set forth in claim 13 further comprising an outer layer disposed on the armrest core and configured to be separable from the armrest core.

15. The armrest assembly as set forth in claim 14 wherein the armrest core is rigid relative to the outer layer.

16. The armrest assembly as set forth in claim 13 wherein the connection feature is a pin engaging the side of the armrest core and extending transversely to the side of the armrest core.

17. The armrest assembly as set forth in claim 13 wherein the actuator includes a pyrotechnic charge.

18. A side impact system for a vehicle, the side impact system comprising:
a trim panel;
an armrest core supported by the trim panel and moveable translationally relative to the trim panel from a supporting position to a deployed position below the supporting position;
an actuator connected to the armrest core for moving the armrest core from the supporting position to the deployed position; and
an outer layer disposed on the armrest core and connected to the trim panel, the armrest core being moveable relative to the outer layer from the supporting position to the deployed position.

19. A side impact system for a vehicle, the side impact system comprising:
a trim panel;
an armrest core supported by the trim panel and moveable translationally relative to the trim panel from a supporting position to a deployed position below the supporting position;
an actuator connected to the armrest core for moving the armrest core from the supporting position to the deployed position;
wherein the armrest core includes a top surface and a side extending transverse to the top surface, the side being connected to the trim panel when the armrest core is in the supporting position; and
a frangible connection between the side of the armrest core and the trim panel when the armrest core is in the supporting position.

20. An armrest assembly for a vehicle, the armrest assembly comprising:
an armrest core including a top surface and a side extending transverse to the top surface;
an actuator spaced from the armrest core and configured to move the armrest core from a supporting position to a deployed position below the supporting position; and
a cable extending from the actuator to the armrest core; and
wherein the actuator includes a pyrotechnic charge.

21. An armrest assembly for a vehicle, the armrest assembly comprising:
an armrest core including a top surface and a side extending transverse to the top surface;
an actuator spaced from the armrest core and configured to translationally move the armrest core from a supporting position to a deployed position below the supporting position; and
a cable extending from the actuator to the armrest core; and
a pin engaging the side of the armrest core and extending transversely to the side of the armrest core.

* * * * *